United States Patent
Watson et al.

(10) Patent No.: US 8,867,690 B2
(45) Date of Patent: Oct. 21, 2014

(54) PRESSURIZED WATER REACTOR WITH COMPACT PASSIVE SAFETY SYSTEMS

(75) Inventors: Ronald C. Watson, Forest, VA (US); John D. Malloy, Goode, VA (US); Michael J. Edwards, Forest, VA (US)

(73) Assignee: Babcock & Wilcox mPower, Inc., Charlotte, NC (US)

( * ) Notice: Subject to any disclaimer, the term of this patent is extended or adjusted under 35 U.S.C. 154(b) by 515 days.

(21) Appl. No.: 13/217,941

(22) Filed: Aug. 25, 2011

(65) Prior Publication Data

US 2013/0051511 A1    Feb. 28, 2013

(51) Int. Cl.
*G21C 13/02* (2006.01)
*G21C 15/00* (2006.01)
*G21D 1/00* (2006.01)
*G21C 9/004* (2006.01)
*G21C 15/18* (2006.01)
*G21D 3/06* (2006.01)
*G21C 13/00* (2006.01)

(52) U.S. Cl.
CPC *G21D 1/00* (2013.01); *G21C 9/004* (2013.01); *G21C 13/02* (2013.01); *G21C 15/18* (2013.01); *G21D 3/06* (2013.01); *Y02E 30/32* (2013.01)
USPC ........... 376/273; 376/277; 376/282; 376/287; 376/293; 376/294; 376/298

(58) Field of Classification Search
CPC ......... Y02E 30/00; Y02E 30/30; Y02E 30/40; G21C 13/00; G21C 13/02; G21C 13/10; G21C 15/00; G21C 15/18; G21D 1/00; G21D 1/02; G21D 9/00
USPC ......... 376/273–276, 260, 272, 277, 282, 283, 376/287, 293–296, 298, 299
See application file for complete search history.

(56) References Cited

U.S. PATENT DOCUMENTS

| | | | | |
|---|---|---|---|---|
| 2,743,224 A * | 4/1956 | Ohlinger | ......................... | 376/282 |
| 2,951,946 A * | 9/1960 | Goodman et al. | ............. | 376/273 |
| 2,952,019 A * | 9/1960 | Goodman | ...................... | 376/273 |
| 3,393,127 A * | 7/1968 | Detman et al. | ................ | 376/273 |
| 3,865,688 A * | 2/1975 | Kleimola | ....................... | 376/283 |
| 3,984,282 A * | 10/1976 | Kleimola | ....................... | 376/282 |
| 4,213,824 A * | 7/1980 | Jabsen | .......................... | 376/283 |
| 4,363,780 A * | 12/1982 | Hannerz | ....................... | 376/282 |
| 4,366,113 A * | 12/1982 | Gigou | ........................... | 376/272 |
| 5,008,069 A * | 4/1991 | Fredell | .......................... | 376/299 |
| 5,102,616 A * | 4/1992 | Gardner et al. | ............... | 376/282 |

(Continued)

FOREIGN PATENT DOCUMENTS

WO    WO2013/028408 A1 *  2/2013 ............ G21C 15/00

*Primary Examiner* — Bernarr Gregory
(74) *Attorney, Agent, or Firm* — Michael J. Seymour; Eric Marich

(57) ABSTRACT

A nuclear reactor includes a pressure vessel and a nuclear reactor core disposed in the pressure vessel. A subterranean containment structure contains the nuclear reactor. An ultimate heat sink (UHS) pool is disposed at grade level, and an upper portion of the subterranean containment structure defines at least a portion of the bottom of the UHS pool. In some embodiments, the upper portion of the subterranean containment structure comprises an upper dome, which may protrude above the surface of the UHS pool to define an island surrounded by the UHS pool. In some embodiments, a condenser comprising a heat exchanger including hot and cold flow paths is disposed inside the subterranean containment structure; and cooling water lines operatively connect the condenser with the UHS pool.

14 Claims, 2 Drawing Sheets

(56) References Cited

U.S. PATENT DOCUMENTS

| | | | |
|---|---|---|---|
| 5,112,569 A * | 5/1992 | Cinotti | 376/282 |
| 5,215,708 A * | 6/1993 | Fennern et al. | 376/293 |
| 5,243,631 A * | 9/1993 | Cearley et al. | 376/260 |
| 5,268,942 A * | 12/1993 | Newton et al. | 376/272 |
| 5,345,481 A * | 9/1994 | Oosterkamp | 376/293 |
| 5,570,401 A * | 10/1996 | Gluntz | 376/283 |
| 5,642,389 A * | 6/1997 | Mattern et al. | 376/283 |
| 6,285,727 B1 * | 9/2001 | Bredolt et al. | 376/282 |
| 6,351,510 B1 * | 2/2002 | Bredolt et al. | 376/283 |
| 8,170,173 B2 * | 5/2012 | Reyes et al. | 376/282 |

\* cited by examiner

PRESSURIZED WATER REACTOR WITH COMPACT PASSIVE SAFETY SYSTEMS

BACKGROUND

The following relates to the nuclear reactor arts, nuclear power generation arts, nuclear safety arts, and related arts.

Nuclear reactor safety centers upon maintaining the radioactive core in an immersed condition with adequate heat removal. During normal operation, the reactor core is disposed in a sealed reactor pressure vessel that is filled (or mostly filled) with primary coolant (e.g., light water, in the case of a light water reactor). Heat removal is provided by circulation of the primary coolant through a "heat sink". In the case of a nuclear power plant, the "heat sink" usually takes the form of a steam generator or turbine. For example, in a boiling water reactor (BWR) the primary coolant boils in the pressure vessel and primary coolant steam isolated by a steam separator/dryer assembly is sent to a turbine where the act of performing useful work on the turbine cools the steam. The condensed steam flows back into the pressure vessel of the BWR to complete the primary coolant circuit. The turbine, in turn, drives an electrical power generator so as to generate the electrical output of the BWR-based power plant.

In the case of a pressurized water reactor (PWR), the primary coolant is maintained in a subcooled liquid phase (except possibly in a steam bubble at the top of the pressure vessel). The subcooled liquid primary coolant is pumped through a steam generator located external to the pressure vessel where heat is transferred to secondary coolant that in turn drives the turbine. The primary coolant exiting the steam generator flows back into the pressure vessel to complete the primary coolant circuit.

In a variant "integral" PWR design, the steam generator is located internally within the pressure vessel. In a typical integral PWR design, an annular riser is disposed in the pressure vessel to define inner "riser" and outer annular "downcomer" regions. The primary coolant flows upward (away from the reactor core) in the riser region and back downward in the outer annular downcomer region to complete the primary flow circuit. The internal steam generator is typically disposed in the downcomer region, and comprises tubes having primary coolant flowing downward inside the pipes and secondary coolant flowing upward outside the pipes (or, alternatively, the secondary coolant may flow upward inside the tubes and the primary coolant downward outside the tubes).

Safety systems are designed to remediate various possible events that could compromise the objective of keeping the reactor core immersed in primary coolant and adequately cooled. Two possible events that are addressed by the safety systems are: a loss of coolant accident (LOCA); and a loss of heat sinking accident. Conventionally, safety systems include a steel containment structure surrounding the pressure vessel and of sufficient structural strength to contain released primary coolant steam. Condensers are disposed inside the containment structure in order to condense the primary coolant steam so as to reduce pressure inside containment. An ultimate heat sink comprising a large body of water located externally from the containment structure provides the thermal sink for heat captured by the condensers. A refueling water storage tank (RWST) located inside the containment structure provides water during refueling operations, and also serves as a source of water in emergencies.

In a LOCA, a rupture in the pressure vessel or in connecting piping (e.g., pipes conducting primary coolant to/from an external turbine or steam generator) causes the pressure vessel to depressurize and possibly leak primary coolant. Remediation of a LOCA includes (1) containing and condensing primary coolant steam in order to depressurize the system; and (2) replenishing water to the pressure vessel in order to keep the reactor core immersed. The RWST provides replenishment water, while the condensers located inside the containment structure provide a mechanism for recondensing the escaped primary coolant steam.

In a loss of heat sinking event the "heat sink" is lost. In a BWR, this can occur if the flow of primary coolant steam to the turbine is interrupted (for example, because the turbine must be shut down unexpectedly or abruptly fails). In a PWR, the corresponding event is interruption of subcooled primary coolant flow through the external steam generator. In an integral PWR, the corresponding event is loss of secondary coolant flow through the internal steam generator. In any loss of heat sinking event, the response includes venting steam from the pressure vessel to the condensers located inside the containment structure in order to remove heat and controllably depressurize the pressure vessel. Ideally this will be performed using a closed system in which steam from the pressure vessel is vented into the condensers. However, if the pressure rise due to loss of heat sinking is too rapid it may be necessary to vent into the containment structure (in effect, converting the loss of heat sinking event into a controlled LOCA).

BRIEF SUMMARY

In one aspect of the disclosure, an apparatus comprises: a nuclear reactor including a pressure vessel and a nuclear reactor core disposed in the pressure vessel; a subterranean containment structure containing the nuclear reactor; and an ultimate heat sink pool disposed at grade level wherein an upper portion of the subterranean containment structure defines at least a portion of the bottom of the ultimate heat sink pool. In some embodiments, the upper portion of the subterranean containment structure comprises an upper dome. In some embodiments, the apparatus further comprises: a condenser comprising a heat exchanger including hot and cold flow paths disposed inside the subterranean containment structure; and cooling water lines operatively connecting the condenser with the ultimate heat sink pool.

In another aspect of the disclosure, an apparatus comprises: a pressurized water reactor (PWR) including a pressure vessel and a nuclear reactor core disposed in the pressure vessel; a subterranean containment structure containing the nuclear reactor; and an ultimate heat sink pool having a bottom defined at least in part by an upper portion of the subterranean containment structure. In some embodiments, the upper portion of the subterranean containment structure comprises an upper dome. In some such embodiments, the upper dome protrudes above the surface of the ultimate heat sink pool to define an island surrounded by the ultimate heat sink pool.

In another aspect of the disclosure, an apparatus comprises: a nuclear reactor including a pressure vessel and a nuclear reactor core disposed in the pressure vessel; a containment structure containing the nuclear reactor; an ultimate heat sink pool disposed on top of the containment structure wherein the containment structure defines a bottom of the ultimate heat sink pool; a condenser comprising a heat exchanger including hot and cold flow paths disposed inside the containment structure; and cooling water lines operatively connecting the condenser with the ultimate heat sink pool.

BRIEF DESCRIPTION OF THE DRAWINGS

The invention may take form in various components and arrangements of components, and in various process opera- FIG. 1 diagrammatically shows a side sectional view of a nuclear reactor facility including emergency safety systems as disclosed herein.

DETAILED DESCRIPTION OF THE PREFERRED EMBODIMENTS

Disclosed herein are improved emergency safety systems which have advantages of passive operation and reduced susceptibility to being compromised by external influences such as flooding, earthquakes, hostile assault, and so forth.

Figure 1:
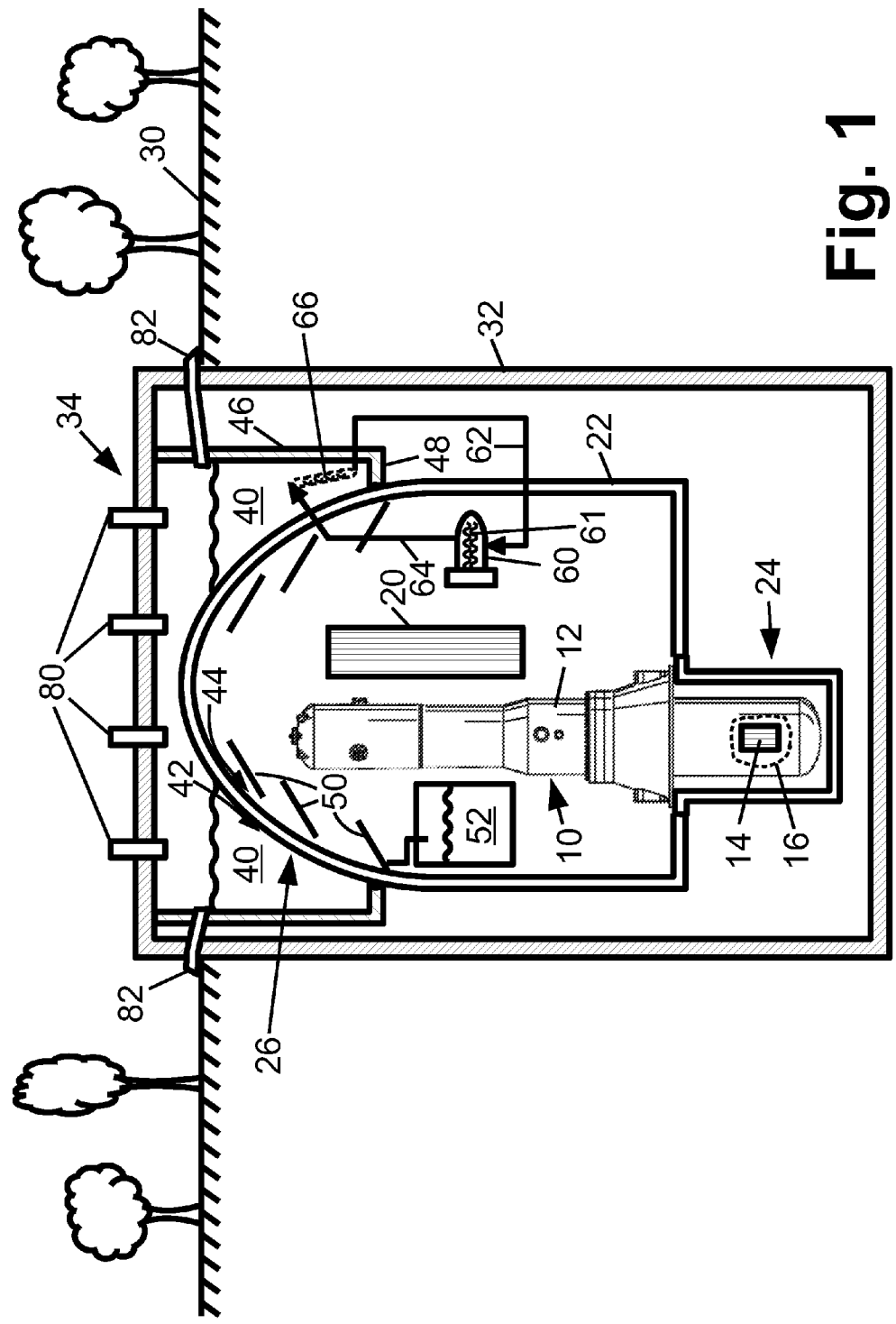

With reference to FIG. 1, an illustrative nuclear reactor of the pressurized water reactor (PWR) type 10 includes a pressure vessel 12, which in the illustrative embodiment is a cylindrical vertically mounted vessel. A nuclear reactor core 14 is disposed in a lower portion of the pressure vessel 12. (Note that in diagrammatic FIG. 1 the reactor care 14 is revealed by a cutaway 16 in the pressure vessel 12). The reactor core 14 includes a mass of fissile material, such as a material containing uranium oxide ($UO_2$) that is enriched in the fissile $^{235}U$ isotope, in a suitable matrix material. In a typical configuration, the fissile material is arranged as "fuel rods" arranged in a core basket. The pressure vessel 12 contains primary coolant water (typically light water, that is, $H_2O$, although heavy water, that is, $D_2O$, is also contemplated) in a subcooled state.

The PWR 10 includes other components known in the art that are not shown, such as a "basket" or other structure supporting the reactor core 14 in the pressure vessel 12, neutron-absorbing control rods selectively inserted into the reactor core 14 by a control rod drive mechanism (CRDM) to control the nuclear chain reaction, and central riser that defines a primary coolant circulation path inside the pressure vessel 12, primary coolant pumps, or so forth. These various components may be variously disposed inside or outside the pressure vessel. For example, the CRDM may be external, as is conventionally, the case, or may be located internally inside the pressure vessel as described in Stambaugh et al., "Control Rod Drive Mechanism for Nuclear Reactor", U.S. Pub. No. 2010/0316177 A1 published Dec. 16, 2010 which is incorporated herein by reference in its entirety; and Stambaugh et al., "Control Rod Drive Mechanism for Nuclear Reactor", Intl Pub. WO 2010/144563 A1 published Dec. 16, 2010 which is incorporated herein by reference in its entirety. The reactor coolant pumps may be internal or external, and in some embodiments may be omitted entirely in which case heat generated by the reactor core 14 drives primary coolant flow via natural circulation.

The illustrative PWR 10 is an integral PWR design, by which it is meant that an internal steam generator is disposed in the pressure vessel 12. The installed steam generator is not shown; however, FIG. 1 diagrammatically shows a removed internal steam generator 20 that has been removed from the pressure vessel 12 for maintenance, or is located as shown prior to installation into the pressure vessel 12, or so forth. Additional conventional components are not shown, such as a crane for lifting an upper pressure vessel section in order to open the pressure vessel 12 and for moving the steam generator 20; various scaffolding, walkways or the like for movement of personnel, various auxiliary equipment and electronics, and so forth.

The PWR 10 is contained in a containment structure 22. The containment structure 22 is typically a steel structure in order to provide structural strength and high thermal conductivity (to facilitate heat removal techniques as disclosed herein). Additionally or alternatively, portions or all of the containment structure 22 may be made of steel-reinforced concrete, a composite material such as a steel host with embedded nanoparticles to enhance thermal conductivity, or so forth.

The illustrative containment structure 22 is generally cylindrical, and further includes a lower flood well 24 and an upper dome 26. The lower flood well contains the lower portion of the pressure vessel 12 including the reactor core 14. This flood well enables the lower region to be flooded with water in certain emergency situations in order to assist in cooling the reactor core 14. As disclosed herein, the upper dome 26 provides enhanced structural strength and serves as a steam condensation surface in certain emergency situations. The containment structure 22 is large enough to accommodate the PWR 10 and to additionally provide space for operations such as removing the steam generator 20 during installation and/or maintenance.

The containment structure 22 is subterranean, by which it is meant that the containment structure 22 lies below grade, that is, below the ground level 30 (except possibly for an uppermost extremity of the upper dome 26). A secondary containment structure 32 contains the (primary) containment structure 22. The secondary containment structure 32 is typically made of concrete, steel-reinforced concrete, or another suitably robust building material. In embodiments disclosed herein the secondary containment structure 32 is not a thermal pathway and hence the thermal conductivity of the material constituting the secondary containment structure 32 is not a design consideration (thus, making concrete one suitable material). The secondary containment structure 32 is mostly subterranean in order to "contain" the subterranean primary containment structure 22; however, an upper "roof" 34 of the secondary containment structure 32 is above-ground.

The subterranean arrangement of the containment structure 22, as well as its relatively large size, facilitates employing a passive emergency cooling system comprising an at-grade (that is, at ground level) ultimate heat sink (UHS) pool 40 in thermal communication with the upper dome 26 of the containment structure 22. The upper dome 26 has an outside surface 42 that serves as at least a portion of the "bottom" of the UHS pool 40, and an inside surface 44 that serves as a condensation surface that is cooled by the UHS pool 40. The UHS pool 40 is contained by the upper dome 26 defining at least a portion of the "bottom" of the pool 40 along with sidewalls 46 and, in the illustrative embodiment, an additional bottom portion 48 that is welded with (or otherwise in sealed connection with) the upper dame 26. In some embodiments the additional bottom portion 48 may be omitted and the sidewalls are instead welded directly with (or otherwise in direct sealed connection with) the upper dome 26.

By "at grade" or "at ground level" it is meant that the water in the UHS pool 40 is mostly or entirely at or below ground level, and the surface of the water when the UHS pool 40 is at its maximum capacity is about at ground level. The surface may be slightly below ground level, but it should not be so far below ground level that an earthquake, explosion, or other disruption could cause the surrounding ground to cave into the UHS pool 40 and obliterate the pool. Similarly, the surface may be slightly above ground level (for example, by constructing the sidewalls to extend above-grade), but it should not be so far above ground level that an above-ground leak could result in the UHS pool being drained.

The upper portion (i.e., roof 34) of the secondary containment structure 32 is optionally omitted. Including the roof 34 enables better control over the composition (e.g., chemistry) of the UHS pool 40, and prevents debris from falling into the UHS pool 40. In some embodiments the UHS pool is provided with a cover that is separate from the secondary containment structure. On the other hand, in some embodiments the sidewalls 46 and optional bottom portion 48 of the UHS pool may form part of the secondary containment structure. More generally, various levels and degrees of integration and/or separation between the walls and bottom of the UHS pool 40, on the one hand, and the secondary containment 32 on the other hand, are contemplated. It is also contemplated to omit the secondary containment structure 32 entirely, if such an omission does not compromise safety and does not violate applicable nuclear regulatory standards.

The UHS pool 40 provides passive heat removal as follows. Primary coolant released from the pressure vessel 12 (whether in an uncontrolled LOCA or in a controlled fashion such as may be performed in a loss of heat sinking event) naturally rises and contacts the inside surface 44 of the dome 26. The UHS pool 40 in contact with the outside surface 42 of the dome 26 keeps the dome 26 at outside ambient temperature (or, more precisely, at about the temperature of the water in the UHS pool 40, which is at or close to outside ambient temperature). The high thermal conductivity of the steel (or other suitably chosen material) of the dome 26 ensures that the outside and inside surfaces 42, 44 are at about the same temperature. Thus, the inside surface 44 is cold (e.g., at or below 40° C. for most climates) as compared with the steam (which is at or above 100° C.). The primary coolant steam thus condenses onto the inside surface 44 of the dome 26, and its latent heat and any additional kinetic energy is transferred through the (high thermal conductivity) dome 26 to the UHS pool 40.

The condensed primary coolant is in the form of water (or water droplets) adhering to the inside surface 44 of the dome 26. In some embodiments this water is simply allowed to fall or run downward along the surface under the influence of gravity. Advantageously, this may result in a substantial portion of the condensed water flowing into the flood well 24 to contribute to flooding the flood well 24. Alternatively, baffles 50 are provided to guide the flow of the condensed water. In the illustrative embodiment the baffles 50 are arranged to guide the condensed water into a refueling water storage tank (RWST) 52 which is used in some emergency conditions (such as some LOCA events) to replenish water in the pressure vessel 12.

In some embodiments, the UHS pool 40 is also used as the source of cooling water for a condenser 60 disposed inside the containment structure 22. The condenser 60 provides an additional mechanism for condensing primary coolant steam. In some embodiments, and in some emergency conditions, the condenser 60 inlet is coupled directly with the inside of the containment structure 22 in order to condense primary coolant steam that has been released into the containment structure 22. In some embodiments, and in some emergency conditions, the condenser 60 may be connected with the pressure vessel 12 (connection not illustrated) in order to condense primary coolant steam inside the pressure vessel 12. This latter approach may be useful, for example, in the case of a loss of heat sinking event in which the sealing integrity of the pressure vessel 12 has not been compromised but pressure inside the pressure vessel 12 is rising (and primary coolant being converted to steam) due to the loss of heat sinking. The condenser 60 comprises a heat exchanger 61 including hot and cold flow paths (indicated diagrammatically in FIG. 1). The primary coolant steam flows in the hot path, while cooling water flows through the cold path. The hot and cold flow paths are in fluid isolation from one another but are in thermal communication with each other. For example, the condenser 60 may include tubes in a manifold, where the tubes form one flow path and the manifold the other flow path. In another contemplated configuration, the hot and cold flow paths may be two intertwined tubes.

Cooling water flows from the UHS pool 40 into the condenser 60 via an inlet pipe 62, and heated cooling water (which may still be water, or may be steam, or may be some mixed steam/water phase) flows via an outlet pipe 64 back to the UHS pool 40. The illustrative pipes 62, 64 have open ends in fluid communication with the UHS pool 40; alternatively, these ends may connect with a heat exchanger coil 66 (shown in phantom in FIG. 1) disposed in the UHS pool 40 such that the cooling water is in fluid isolation from both the primary coolant steam and the UHS pool 40. The embodiment of FIG. 1 includes the condenser 60 comprising the heat exchanger 61 including hot and cold flow paths disposed inside the subterranean containment structure 22, with cooling water lines 62, 64 operatively connecting the condenser 60 with the UHS pool 40. While the single condenser 60 is illustrated, it is to be understood that one, two, three, four, or more condensers 60 may be disposed in the subterranean containment structure 22 with suitable connecting cooling water lines 62, 64. The use of multiple condensers 60 can provide redundancy, and may be required by applicable nuclear regulatory rules. Moreover, when multiple condensers 60 are provided the hot flow paths may be connected with different locations. For example, one or more condensers may be connected with the pressure vessel 12 to provide condensation action for primary coolant steam that is contained inside the pressure vessel 12, and one or more condensers be arranged to operate on the interior volume of the subterranean containment structure 22 to provide condensation action for primary coolant steam that escapes from the pressure vessel 12 during a LOCA.

It is also to be understood that in some embodiments the condensers may be omitted, or may have their cold flow paths connected with a cooling water source other than the UHS pool 40. In some such embodiments, the only heat transfer path from the interior of the subterranean containment structure 22 to the UHS pool 40 is via the upper dome 26 of the containment structure 22.

Configuration of the upper portion of the containment structure 22 as the illustrated upper dome 26 has certain advantages. The dome shape has advantageous structural strength which is useful in supporting the weight of the UHS pool 40, since the upper dome 26 serves as at least a portion of the bottom of the UHS pool 40. The dome shape also provides a larger surface area as compared with a flat roof. Nonetheless, it is contemplated for the upper portion of the containment structure supporting the UHS pool to have a configuration other than a dome shape, such as being a flat roof, angled roof, or so forth.

Figure 3:
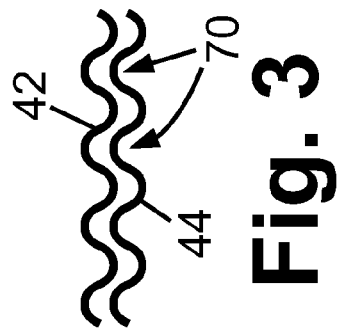
FIGS. 3 and 4 diagrammatically show side views of two embodiments of the surface area-enhancing grooves or undulations of FIG. 2.
Figure 4:
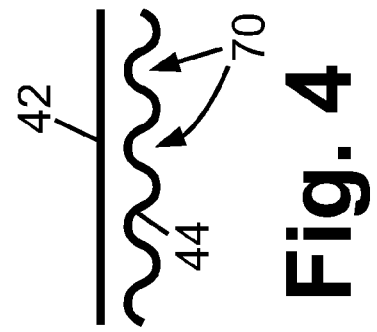
Figure 2:
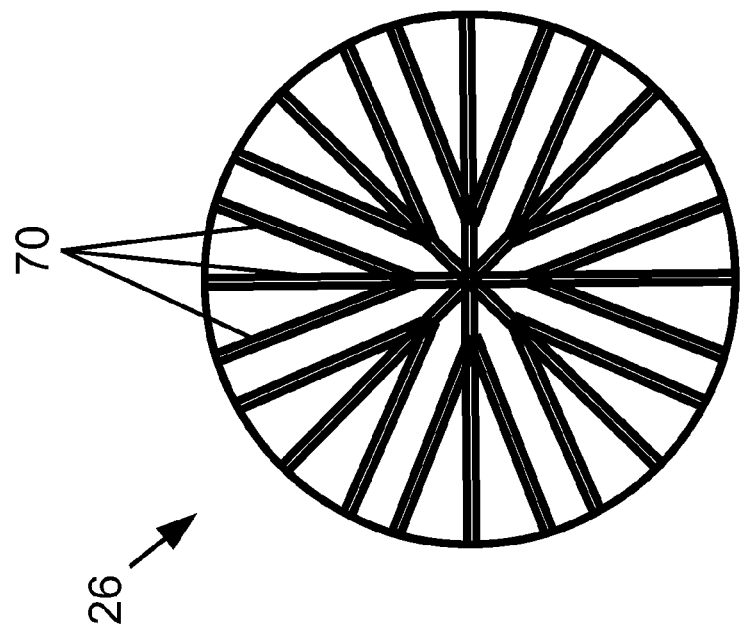
FIG. 2 diagrammatically shows an overhead view of an embodiment of the containment structure of FIG. 1 including surface area-enhancing grooves or undulations.

With brief reference to FIGS. 2-4, the illustrative upper dome 26 optionally includes grooves or undulations 70 that increase the surface area for condensation. FIG. 2 provides an overhead view of the upper dome 26 illustrating an advantageous configuration in which the grooves or undulations run "downward" along the general direction that the condensate is expected to flow. FIGS. 3 and 4 show two suitable configurations for the grooves or undulations 70. FIGS. 3 and 4 show sections through a small portion of the upper dome 26 with the sectioning plane oriented transverse to the direction of the grooves or undulations 70. In the embodiment of FIG. 3 the grooves or undulations 70 are formed on both the outside surface 42 and the inside surface 44 of the upper dome 26. This configuration can have manufacturing advantages in that the thickness of the upper dome 26 is constant (albeit undulating or including grooves). In the embodiment of FIG. 4 the grooves or undulations 70 are formed only on the inside surface 44 of the upper dome 26 (and hence would not actually be visible in the overhead view of FIG. 2). This configuration recognizes that the surface area of interest for condensation, which is to be made as large as practicable, is the inside surface 44 whereas the upper surface 42 can be of smaller area. The configuration of FIG. 4 can provide improved structural rigidity and robustness due to the additional material retained by not including the grooves or undulations in the outside surface 42.

With reference back to FIG. 1, during a LOCA primary coolant steam is released into the subterranean containment structure 22. The primary coolant steam condenses at the inside surface 44 of the upper dome 26, and its latent heat and any additional kinetic energy is transferred through the (high thermal conductivity) dome 26 to the UHS pool 40. This raises the temperature of the water comprising the UHS pool 40, and causes increased evaporation from the surface of the UHS pool 40. If the heat transfer is of sufficient rate and magnitude the water comprising the UHS pool 40 may actually boil to produce steam emanating from the surface of the UHS pool 40. The secondary containment structure 32 containing the subterranean containment structure 22 and the UHS pool 40 has vents 80 arranged to allow water evaporated or boiled off of the UHS pool 40 to escape from the secondary containment structure 32. The UHS pool 40 should have sufficient water to maintain cooling for a design time without any refilling of the UHS pool 40, such as at least three days in accordance with some nuclear regulatory rule paradigms, or up to 14 days in some more aggressive regulatory rule paradigms. In some embodiments it is contemplated that the UHS pool 40 may comprise hundreds of thousands of gallons of water or more. However, the quantity of water sufficient for a given operational period is expected to depend upon various factors such as thermal power, design pressure, and so forth, and accordingly this is to be understood as being merely an illustrative example.

More generally, heat transfer from the interior of the containment structure 22 to the UHS pool 40 is via the area of the portion of the bottom of the UHS pool 40 that is defined by (and hence in contact with) the upper portion 26 of the subterranean containment structure 22. The wetted area and tank volume should be sufficient to remove decay heat generated in the reactor core 14 and thereby maintain suitably low pressure and temperature conditions within the containment structure 22. The heat transfer q from the containment 22 to the UHS pool 40 is given by: $q = U \cdot A_{wet} \cdot \Delta T$ where $A_{wet}$ denotes the wetted area, U denotes the overall heat transfer coefficient for heat transfer from the containment 22 to the UHS pool 40, and $\Delta T$ denotes the temperature difference between the containment 22 and the UHS pool 40. To provide sufficient cooling, $q \geq Q_{decay\,heat}$ should hold, where $Q_{decay\,heat}$ denotes the heat generated by the reactor core 14 due to fission product decay following reactor shutdown. Solving $U \cdot A_{wet} \cdot \Delta T \geq Q_{decay\,heat}$ for the wetted area $A_{wet}$ (that is, for the area of the portion of the bottom of the UHS pool 40 that is defined by, and hence in contact with, the upper portion 26 of the subterranean containment structure 22) yields:

$$A_{wet} \geq \frac{Q_{decay\,heat}}{U \cdot (T_{max} - T_{UHS})}. \tag{1}$$

In the above Criterion (1), $A_{wet}$ denotes the wetted area, $T_{max}$ denotes the maximum allowable temperature inside the containment, $T_{UHS}$ denotes the maximum allowable temperature of the UHS pool 40, $Q_{decay\,heat}$ denotes the highest postulated value for heat generated by the reactor core 14 due to fission product decay following reactor shutdown, and U denotes the overall heat transfer coefficient for heat transfer from the containment 22 to the UHS pool 40. More particularly, components that contribute to the overall heat transfer coefficient U include: heat transfer by condensation and convection from the interior of the containment 22 to the inside surface of the upper portion 26 of containment 22; heat conduction through the containment shell; and heat transfer from the outside surface of the upper portion 26 of containment 22 into the UHS pool 40 by boiling and/or convection of water of the UHS pool 40. The generated decay heat $Q_{decay\,heat}$ decreases with time following reactor shutdown and is dependent upon the reactor operating power history (that is, the history of operating power as a function of time prior to shutdown). As indicated by Criterion (1), the minimum permissible wetted area should scale with the amount of decay heat to be dissipated. To be conservative, the UHS pool 40 should be designed for the largest value of $Q_{decay\,heat}$ postulated for any accident scenario under consideration. The maximum allowable temperature $T_{max}$ is the maximum long-term temperature desired for the containment 22. The initial energy release resulting from a loss of coolant accident (LOCA) may cause a brief temperature transient during which the temperature inside the containment 22 briefly exceeds $T_{max}$. The maximum temperature $T_{max}$ should be kept low enough to ensure that electrical wiring, valve actuators, instrumentation, and other critical devices inside the containment 22 continue to operate. The temperature $T_{UHS}$ is the maximum allowable temperature of the water in the UHS pool 40. The temperature of the water in the UHS pool 40 is expected to vary with time after reactor shutdown as heat is transferred through the upper portion 26 of the subterranean containment 22 into the UHS pool 40. A limitation $T_{UHS} \leq 100°$ C. is imposed by the boiling point of water at atmospheric pressure. As heat transfer decreases with increasing temperature $T_{UHS}$ of the UHS pool 40, a conservative value is $T_{UHS} = 100°$ C. Yet another consideration in the design is that the wetted area $A_{wet}$ may decrease over time after reactor shutdown as water boils off or evaporates from the UHS pool 40. In some cases this concern may be obviated by the fact that the decay heat output is highest just after reactor shutdown at which time the water level of the UHS pool 40 has not yet been depleted. Also, for a LOCA credit can be taken for the effect of the thermal capacitance of equipment within the containment 22, and of the containment structure 22 itself, in order to reduce pressure and temperature immediately following an energy release.

The UHS pool 40 can reduce or stabilize pressure in the containment 22 provided that Criterion (1) is met. The values for the parameters $A_{wet}$, U, $Q_{decay\,heat}$, $T_{max}$, and $T_{UHS}$ used in designing in accord with Criterion (1) can be assessed in various ways. In one approach, $Q_{decay\,heat}$ is set to its initial, highest value (i.e., the value just after any brief transient accompanying the LOCA or other shutdown event). The maximum allowable temperature $T_{max}$ should be set to a conservatively low value (note that a lower value of $T_{max}$ drives the minimum permissible wetting area higher). Similarly, a conservatively high value of $T_{UHS}$ should be used (a higher value decreases ΔT and hence drives the minimum permissible wetting area higher). A conservative approach is to set $T_{UHS}$=100° C. The overall heat transfer coefficient U can be adjusted to some extent by controlling parameters such as the wall thickness of the upper portion 26 of the containment 22 (but, that wall bears weight from the UHS pool 40 and this limits on how thin the wall can be made). Similarly, the wetted area $A_{wet}$ can be adjusted based an the overall structural design geometry or layout. Note that an alternative formulation of Criterion (1) is $U \cdot A_{wet} \cdot \Delta T_{min} \geq Q_{decay\ heat}$ where $\Delta T_{min}$ denotes the minimum temperature difference between the containment 22 and the UHS pool 40 postulated to occur during any accident scenario under consideration.

Although not illustrated, it is contemplated for the vents 80 to include screens, bends, or other features to reduce the likelihood of becoming clogged by debris. It is also contemplated for one or more of the vents 80 to take the form of one or more chimney stacks, while other openings serve as air inlets in order to set up a draught within the volume defined between the surface of the UHS pool 40 and the roof 34 of the secondary containment structure 32.

Operation of the illustrative safety systems shown in FIG. 1 are as follows. In a LOCA, a breach in the pressure boundary of the pressure vessel 12 causes primary coolant water to escape from the vessel. The reactor coolant system (RCS) responds by depressurizing the pressure vessel 12 and containment 22 using the one or more condensers 60 and the additional condensation provided by the cooling of the dome 26 by the UHS pool 40. Once depressurization reduces the pressure to a sufficiently low level, additional water is injected into the pressure vessel 12 from the refueling water storage tank (RWST) 52 located inside the containment 22. Decay heat from the reactor core 14 boils this water and continues to release it to the containment 22 until active systems (not shown) are brought online to provide normal cooling. The passive cooling systems 26, 40, 60 are designed to remove much of this energy for at least 72 hours (in accordance with regulations of the Nuclear Regulatory Commission, NRC, in the United States) to prevent excessive pressures inside containment. The water stored in the UHS pool 40 above the containment dome 26 is in direct contact with the steel containment surface to provide a large surface for heat transfer. The energy inside the containment 22 heats the water of the UHS pool 40, possibly up to boiling temperature so as to boil the water of the UHS pool 40. The steam generated is vented to the atmosphere by the vents 80. This venting does not release any radioactivity because the water of the UHS pool 40 is not contaminated.

In a loss of heat sinking event, the RCS pressurizes initiating the emergency core cooling system (ECCS) emergency condenser 60. Primary coolant steam is vented to the inlet of the condenser 60 and the condensate is returned to the reactor pressure vessel 12 (piping not illustrated). The condenser 60 is cooled by low pressure water from an UHS tank 40.

The illustrative safety systems have numerous advantages. Placement of the UHS pool 40 at grade level reduces the likelihood of damage as compared with an elevated ultimate heat sink pool (for example, mounted atop a conventional reactor building). Moreover, even if the containment structures 26, 46, 48 of the UHS pool 40 were to be breached, the result would be that the water comprising the UHS pool 40 would flow downward either into the (primary) containment structure 22 (in the case of a breach of the upper dome 26) or into the secondary containment structure 32 (in the case of a breach of the sidewalls 46 or additional bottom portion 48). In the former case the water would contribute to filling the flood well 24 while in the latter case the water would continue to surround the primary containment structure 22 and hence would continue to act (at least to some degree) as a condensation mechanism.

Another advantage is that the UHS pool 40 can be replenished without elevating the refilling water above grade level 30. FIG. 1 shows illustrative refilling inlets 82 passing through the secondary containment structure 32 and the sidewalls 46. These inlets 82 can be connected with various replenishment water supplies. For example, a natural or artificial lake at higher elevation than the grade level 30 of the nuclear facility could be plumbed to the inlets 82 with suitable parallel manual/electronic valving to enable opening the replenishment line via an automated system or manually (if, for example, electrical power is lost for an extended period). Indeed, the UHS pool 40 can even be replenished by rainwater, flood water, or other naturally occurring surface water, for example by configuring the inlets 82 as gutters (preferably including suitable screening or the like to avoid clogging by debris).

The combination of the subterranean containment structure 22 and the UHS pool 40 disposed above and supported by the containment 22 has the yet further advantage of substantially reducing susceptibility to damage by hostile action. The subterranean arrangement of the containment 22 is a substantial barrier to attack, and the UHS pool 40 provides an additional surface barrier shielding the containment structure 22 (and the nuclear reactor 10 contained within) from projectiles, explosives, or other attack mechanisms.

This reduced access to the subterranean containment structure 22 due to the UHS pool 40 can raise some difficulties during maintenance operations such as refueling. In the illustrative embodiment, this is solved by constructing the upper dome 26 of the subterranean containment structure 22 with sufficient height so as to protrude above the surface of the UHS pool 40 so that the top of the dome 26 defines an island surrounded by the UHS pool 40. A hatch or other access can be provided in this "island" for delivering fresh fuel or other components. Alternatively, if the top of the upper dome is below the water level of the UHS pool, then the UHS pool can be partially drained in order to expose the top of the dome to provide access for maintenance.

The illustrative nuclear reactor 10 is a pressurized water reactor (PWR) with an integral steam generator (integral PWR). However, the disclosed safety systems are also applicable to reactors of other types, such as a PWR with external steam generators, or a boiling water reactor (BWR). In the latter case, the BWR is conventionally contained in a more compact containment structure than that used in PWR designs, and the compact conventional BWR containment may not provide sufficient surface area for contact between the UHS pool and the containment structure. This can be remedies by using a larger containment structure for the BWR reactor, and/or by including the surface area enhancing grooves or undulations 70 in the dome of the BWR containment.

The preferred embodiments have been illustrated and described. Obviously, modifications and alterations will occur to others upon reading and understanding the preceding detailed description. It is intended that the invention be construed as including all such modifications and alterations insofar as they come within the scope of the appended claims or the equivalents thereof.

We claim:
1. An apparatus comprising:
 a nuclear reactor including a pressure vessel and a nuclear reactor core disposed in the pressure vessel;

a subterranean containment structure containing the nuclear reactor; and an ultimate heat sink pool disposed at grade level wherein an upper portion of the subterranean containment structure defines at least a portion of the bottom of the ultimate heat sink pool;

wherein the upper portion of the subterranean containment structure comprises an upper dome that defines at least a portion of the bottom of the ultimate heat sink pool; and wherein an uppermost extremity of the upper dome of the subterranean containment structure extends above the surface of the ultimate heat sink pool to define an island surrounded by the ultimate heat sink pool.

2. The apparatus of claim 1, wherein the upper dome of the subterranean containment structure includes grooves or undulations.

3. The apparatus of claim 1, wherein the subterranean containment structure comprises steel.

4. The apparatus of claim 1, wherein the nuclear reactor comprises a pressurized water reactor (PWR) and the subterranean containment structure is large enough to simultaneously accommodate both the PWR and at least one steam generator designed to operate in or with the PWR.

5. The apparatus of claim 4, wherein the PWR is an integral PWR and the subterranean containment structure is large enough to simultaneously accommodate both the PWR and an internal steam generator disposed outside of the PWR but designed to operate in the integral PWR.

6. An apparatus comprising:
a nuclear reactor including a pressure vessel and a nuclear reactor core disposed in the pressure vessel;
a subterranean containment structure containing the nuclear reactor; and
an ultimate heat sink pool disposed at grade level wherein an upper portion of the subterranean containment structure defines at least a portion of the bottom of the ultimate heat sink pool;
a secondary containment structure containing the subterranean containment structure and the ultimate heat sink pool, the secondary containment structure having vents arranged to allow water evaporated or boiled off of the ultimate heat sink pool to escape from the secondary containment structure; and
gutters disposed in the secondary containment structure to admit surface water from outside the secondary containment structure into the ultimate heat sink pool.

7. An apparatus comprising:
a nuclear reactor including a pressure vessel and a nuclear reactor core disposed in the pressure vessel;
a subterranean containment structure containing the nuclear reactor; and
an ultimate heat sink pool disposed at grade level wherein an upper portion of the subterranean containment structure defines at least a portion of the bottom of the ultimate heat sink pool; and
wherein the portion of the bottom of the ultimate heat sink pool defined by the upper portion of the subterranean containment structure has an area of at least $$\frac{Q_{decay\ heat}}{U \cdot (T_{max} - T_{UHS})}$$

where $T_{max}$ denotes the maximum allowable temperature inside the subterranean containment structure, $T_{UHS}$ denotes the maximum allowable temperature of the ultimate heat sink pool, $Q_{decay\ heat}$ denotes the highest postulated value for heat generated by fission product decay following reactor shutdown, and U denotes the overall heat transfer coefficient for heat transfer from the a subterranean containment structure to the ultimate heat sink pool.

8. The apparatus of claim 7, wherein the ultimate heat sink pool has a capacity of at least 300,000 gallons.

9. An apparatus comprising:
a nuclear reactor including a pressure vessel and a nuclear reactor core disposed in the pressure vessel;
a subterranean containment structure containing the nuclear reactor; and
an ultimate heat sink pool disposed at grade level wherein an upper portion of the subterranean containment structure defines at least a portion of the bottom of the ultimate heat sink pool;
a condenser comprising a heat exchanger including hot and cold flow paths disposed inside the subterranean containment structure; and
cooling water lines operatively connecting the condenser with the ultimate heat sink pool.

10. The apparatus of claim 9, wherein ends of the cooling lines disposed in the ultimate heat sink pool terminate in one of (i) open ends and (ii) connections with a heat exchanger disposed in the ultimate heat sink pool.

11. An apparatus comprising:
a pressurized water reactor (PWR) including a pressure vessel and a nuclear reactor core disposed in the pressure vessel;
a subterranean containment structure containing the nuclear reactor; and
an ultimate heat sink pool having a bottom defined at least in part by an upper portion of the subterranean containment structure, wherein the upper portion of the subterranean containment structure comprises an upper dome and the upper dome of the subterranean containment structure protrudes above the surface of the ultimate heat sink pool to define an island surrounded by the ultimate heat sink pool.

12. An apparatus comprising:
a pressurized water reactor (PWR) including a pressure vessel and a nuclear reactor core disposed in the pressure vessel;
a subterranean containment structure containing the nuclear reactor; and
an ultimate heat sink pool having a bottom defined at least in part by an upper portion of the subterranean containment structure, wherein a contact area $A_{wet}$ between the ultimate heat sink pool and the upper portion of the subterranean containment structure satisfies a criterion $U \cdot A_{wet} \cdot \Delta T_{min} \geq Q_{decay\ heat}$ where $Q_{decay\ heat}$ denotes the highest postulated value for heat generated by fission product decay following reactor shutdown, and U denotes the overall heat transfer coefficient for heat transfer from the a subterranean containment structure to the ultimate heat sink pool, and $\Delta T_{min}$ denotes the minimum temperature difference between the subterranean containment structure and the ultimate heat sink pool postulated to occur during any accident scenario under consideration.

13. An apparatus comprising:
a pressurized water reactor (PWR) including a pressure vessel and a nuclear reactor core disposed in the pressure vessel;
a subterranean containment structure containing the nuclear reactor;

an ultimate heat sink pool having a bottom defined at least in part by an upper portion of the subterranean containment structure;
a condenser comprising a heat exchanger including hot and cold flow paths disposed inside the subterranean containment structure; and
cooling water lines operatively connecting the condenser with the ultimate heat sink pool.

14. An apparatus comprising:
a nuclear reactor including a pressure vessel and a nuclear reactor core disposed in the pressure vessel;
a containment structure containing the nuclear reactor;
an ultimate heat sink pool disposed on top of the containment structure wherein the containment structure defines a bottom of the ultimate heat sink pool;
a condenser comprising a heat exchanger including hot and cold flow paths disposed inside the containment structure; and
cooling water lines operatively connecting the condenser with the ultimate heat sink pool.

* * * * *